US006829241B1

(12) United States Patent
Lee

(10) Patent No.: US 6,829,241 B1
(45) Date of Patent: Dec. 7, 2004

(54) AAL-2/AAL-5 PROCESSING APPARATUS IN MOBILE COMMUNICATION SYSTEM

(75) Inventor: Byung Chun Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 709 days.

(21) Appl. No.: 09/660,414

(22) Filed: Sep. 12, 2000

(30) Foreign Application Priority Data

Sep. 13, 1999 (KR) ........................................ 1999/39026

(51) Int. Cl.[7] .............................................. H04L 12/56
(52) U.S. Cl. ............................ 370/395.64; 370/395.65; 370/401
(58) Field of Search ............................. 370/389, 395.1, 370/395.6, 395.64, 395.65, 397, 401, 411; 709/230, 231, 246, 249

(56) References Cited

U.S. PATENT DOCUMENTS

| | | | |
|---|---|---|---|
| 6,490,296 B2 * | 12/2002 | Shenoi et al. | 370/469 |
| 6,519,261 B1 * | 2/2003 | Brueckheimer et al. | 370/395.52 |
| 6,563,827 B1 * | 5/2003 | Brueckheimer et al. | 370/395.1 |
| 6,574,221 B1 * | 6/2003 | Petersen | 370/395.1 |
| 6,574,223 B1 * | 6/2003 | Brueckheimer et al. | 370/395.6 |
| 6,574,224 B1 * | 6/2003 | Brueckheimer et al. | 370/395.6 |
| 6,590,909 B1 * | 7/2003 | Stacey et al. | 370/537 |
| 6,597,697 B1 * | 7/2003 | Petersen | 370/395.64 |

* cited by examiner

Primary Examiner—Hassan Kizou
Assistant Examiner—D Levitan
(74) Attorney, Agent, or Firm—Fleshner & Kim, LLP

(57) ABSTRACT

The present invention relates to an AAL-2/AAL-5 processing apparatus which is capable of simultaneously processing AAL-2 and AAL-5 cells transmitted through multiple virtual channels between a base station (BTS) and a base station controller(BSC). The AAL-2/AAL-5 processing apparatus in a mobile communication system according to the present invention includes: an user interface for transmitting/receiving cells by connecting to an AAL-2 user; transmission/receiving interface for transmitting/receiving cells by connecting to an ATM layer; an AAL-2 receiving unit for receiving an AAL-2 cell from the transmission/receiving interface and deassembling the same into mini cells to thereafter transmit them to each AAL-2 user; an AAL-2 transmission unit for multiplexing the AAL-2 cell inputted from the user interface into a single cell to thus transmit the same to the ATM layer; an AAL-5 processing unit for processing an AAL-5 signal transmitted from either one of the ATM layer and the AAL-2 user; and a CPU for controlling the AAL-2 receiving unit and the AAL-2 transmission unit upon receipt of the AAL-5 signal from the AAL-5 processing unit.

17 Claims, 4 Drawing Sheets

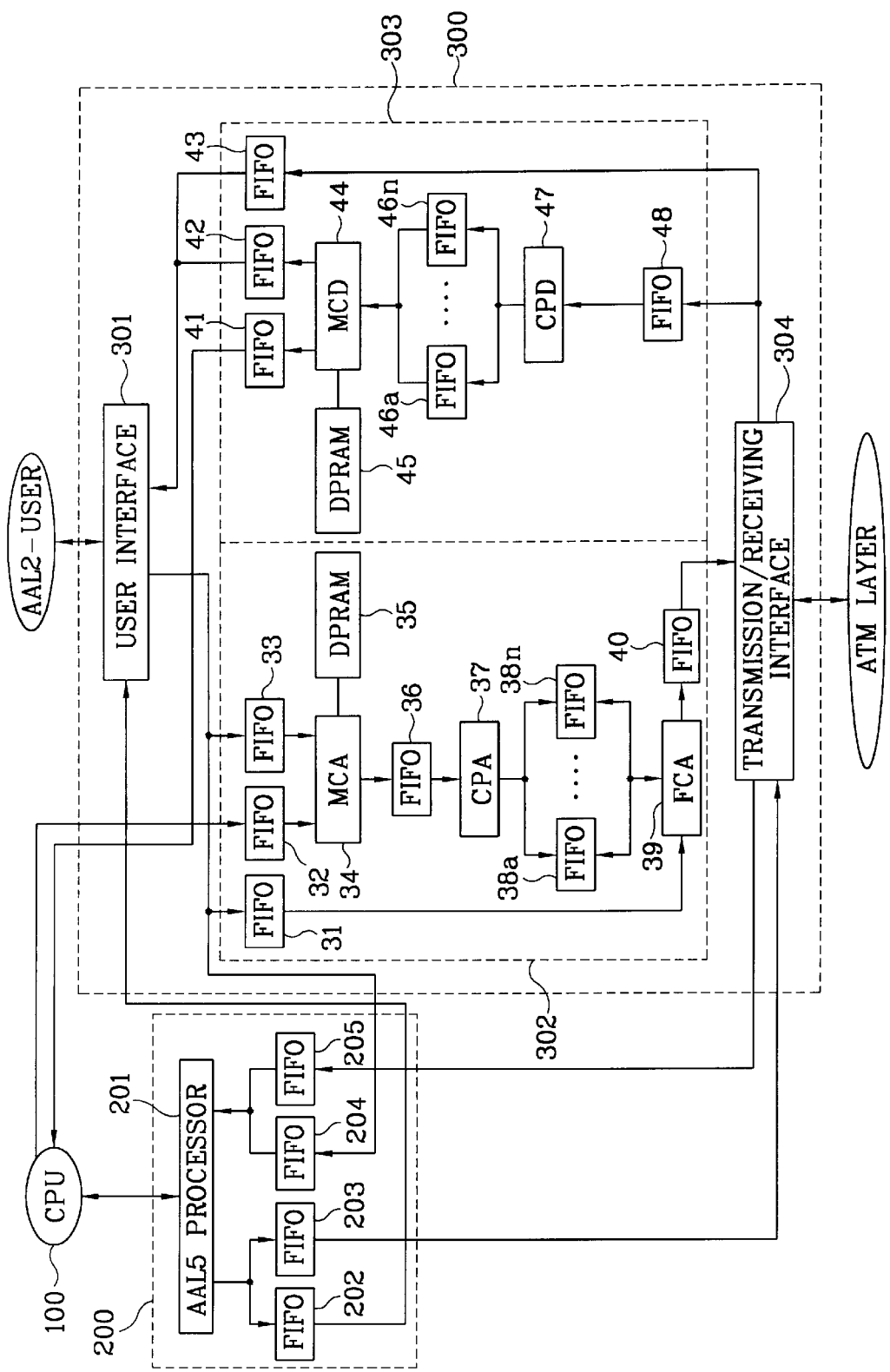

AAL-2/AAL-5 PROCESSING APPARATUS IN MOBILE COMMUNICATION SYSTEM

BACKGROUND OF THE INVENTION

1. Field of the Invention

The present invention relates to a mobile communication system, and more particularly, to an AAL-2/AAL-5 processing apparatus disposed in a base station (BTS) and a base station controller (BSC).

2. Description of the Background Art

Generally, in the ATM (Asynchronous Transfer Mode) transmission method, user information is divided into packets of a predetermined size, and a header, e.g., destination information, is appended to the divided packet for thereby transmitting an ATM cell of a fixed size(53 bytes) to its destination. At this time, an user data having a low bit rate fills parts of the effective load of the ATM cell, and the remainder thereof is padded to "0" to be transmitted.

Therefore, in the case that the ATM transmission method is applied to a wireless network, data (sound data) of a low bit rate transmitted from a plurality of mobile terminals being provided with services from the same base station is packed with each different ATM cell, the effective load part of the ATM cell is wasted. In addition, during the transmission of small length packets packed with a single ATM cell, small length packets transmitted from other mobile terminals cannot be transmitted.

In this way, in the case that the ATM transmission method is applied to the wireless network, partially filled cells are transmitted for thereby degrading the transmission efficiency of links with respect to the network, and a predetermined time has to be waited in order to pack each data to be transmitted for thereby occurring a transmission lag with respect to the system.

AAL Type 2(AAL-2) recommended to solve this problem can reduce the time taken for packing small length user data with ATM cells and effectively use the bandwidth of the ATM network, by multiplexing small length packets transmitted from multiple users on the ATM network into a single ATM cell. That is, the function of multiplexing multiple user data of variable length or small length into a single ATM cell or decomposing the same is a basic technique of AAL-2.

In an ATM system, user information, e.g., a protocol for transmitting packet data consists of a physical layer, ATM layer, AAL layer, and upper layer. The AAL layer is a layer for reassembling packet data delivered from the upper layer into 48 bytes. The ITU-T (International Telecommunication Union-Telecommunication) recommendation defines AAL-1~AAL-5 protocols.

FIG. 1 is a view explaining a conventional AAL-2 protocol.

As illustrated therein, an AAL-2 layer is divided into SSCS (Service Specific Convergence Sublayer) and CPS (Common part Sublayer).

First, when packet data in SDU(Service Data Unit) transmitted from a mobile station through the service access point (SAP) 10 of the upper layer is inputted, the SSCS of the AAL layer appends a header and a trailer to an inputted SDU (AAL-SDU) 11 to generate a SSCS-PDU(Protocol Data Unit) 12.

In addition, the CPS appends a CPS-header to a transmitted SDU(CPS-SDU) 13 to generate a CPS-packet 14, and adds a start field to a CPS-packet payload to generate a 48-byte CPS-PDU 15. The data structure of the CPS-packet 14 and CPS-PDU 15 is illustrated in FIGS. 2 and 3.

As illustrated in FIG. 2, the CF'S-packet consists of a CPS-packet header and a CPS-packet payload. The CPS-packet header consists of a 8-bit CID (Channel Identifier) field identifying a plurality of users in a single virtual channel (hereinafter, referred to as 'VC"), 6-bit LI (Length Indicator) field indicating the size of the effective load of the CPS-packet, SSCS data, UUI field (User-to-User Indication) field indicating a CPS user and a network manager, and 5-bit HEC (Header Error Control) field for the control of an error in the CPS-packet header. At this time, because the CID field is 8 bits, a single VC can hold 256 users.

In addition, as illustrated in FIG. 3, the CPS-PDU wherein CPS-packets from the plurality of users are multiplexed consists of a start field and a CPS-PDU payload. The start field consists of an OSF (Offset Field) field, SN (Sequence Number) field, and Parity (P) field each used for identifying a CPS-packet boundary by a receiving side. In addition, the CPS-PDU payload consists of a CPS-INFO field and PAD (Padding) field indicating packet data of the users. At this time, the CPS-packets become the CPS-PDU payload, and the CPS-packets transmitted from the plurality of users are multiplexed into the CPS-PDU payload.

Afterwards, the CPS-PDU generated from the AAL-2 layer is transmitted to the ATM layer through the service access point(ATM_SAP) 16, and the ATM layer appends a 5-byte ATM header to the 48-byte CPS-PDU to thus generate an ATM cell 17 of the total 53 bytes and thereafter transmit it to its destination through the ATM network. In this manner, packet data transmitted from each mobile station is assembled into 48 bytes through the AAL-2 protocol to thus be used as the payload of the ATM cell.

In this way, in the conventional mobile communication system to which the AAL-2 protocol is adapted, a number of packet data is multiplexed into a single VC(Virtual Channel) to be transmitted. However, since only the single VC has been mentioned in the fields relating to the AAL-2 recommended in the ITU-T until now, it is not relevant to implement the AAL-2 protocol in an actual ATM network. In addition, there is no method for transmitting packet data(or cells) through Multiple Virtual Channels, that is, a plurality of virtual channels recommended as a standard yet.

Therefore, in the mobile communication system to which the AAL-2 protocol is adapted, since it is impossible to transmit packet data from a plurality of mobile stations base stations, and base station controllers to its destination through a plurality of virtual channels, there is a problem that there occur limitations upon capacity of users and transmission speed.

Meanwhile, in the communication system to which the ATM system is adapted, signals related to system management are classified into signals for allocating a CID of each user in the AAL-2 protocol and system control signals (signals for overall communication network flow control, bandwidth allocation control, and call set-up control). At this time, the signal for allocating a CID is controlled by ANP(AAL-2 Negotiation Procedures) according to the AAL-2 protocol, and the signal used as a system control signal is controlled according to the AAL-5 protocol.

SUMMARY OF THE INVENTION

Accordingly, it is an object of the present invention to provide an AAL-2/AAL-5 processing apparatus in a mobile communication system which is capable of transmitting an AAL-2 traffic through multiple virtual channels.

It is another object of the present invention to provide an AAL-2/AAL-5 processing apparatus in a mobile communication system which is capable of processing an AAL-5 signal, a system control signal, along with an AAL-2 traffic.

To achieve the above objects, there is provided an AAL-2/AAL-5 processing apparatus in a mobile communication system according to the present invention which includes: an user interface for transmitting/receiving cells by connecting to an AAL-2 user; transmission/receiving interface for transmitting/receiving cells by connecting to an ATM layer; an AAL-2 receiving unit for receiving an AAL-2 cell from the transmission/receiving interface and deassembling the same into mini cells to thereafter transmit them to each AAL-2 user; an AAL-2 transmission unit for multiplexing the AAL-2 cell inputted from the user interface into a single cell to thus transmit the same to the ATM layer; an AAL-5 processing unit for processing an AAL-5 signal transmitted from either one of the ATM layer and the AAL-2 user; and a CPU for controlling the AAL-2 receiving unit and the AAL-2 transmission unit upon receipt of the AAL-5 signal from the AAL-5 processing unit.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein:

FIG. 5 is a block diagram of an AAL-2/AAL-5 adapted to the mobile communication system of FIG. 4.

DETAILED DESCRIPTION OF THE PREFERRED EMBODIMENTS

The preferred embodiment of the present invention will now be described with reference to the accompanying drawings.

The present invention proposes an AAL-2/AAL-5 processing apparatus in a mobile communication system which supports AAL-2 and AAL-5 at the same time, and supports multiple virtual channels for an AAL-2 traffic, Here, the AAL-2 traffic (e.g., CPS-PDU) indicates all traffics including a voice and a data, and the AAL-5 signal (e.g., received in AAL-5 cell) indicates a control signal relating to the management of a communication system.

Figure 1:
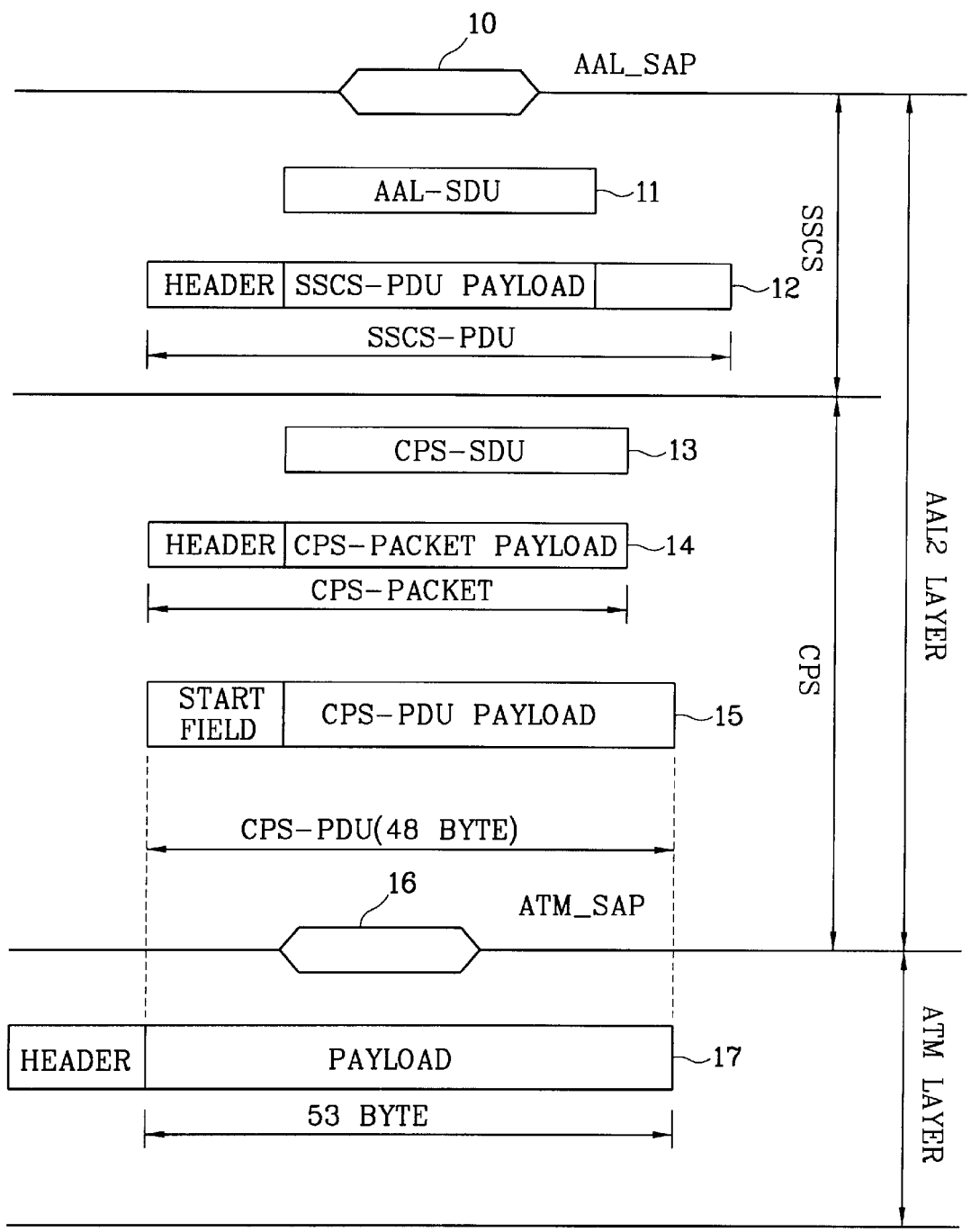
FIG. 1 is a view explaining a conventional AAL-2 protocol recommended by the ITU-T.
Figure 2:
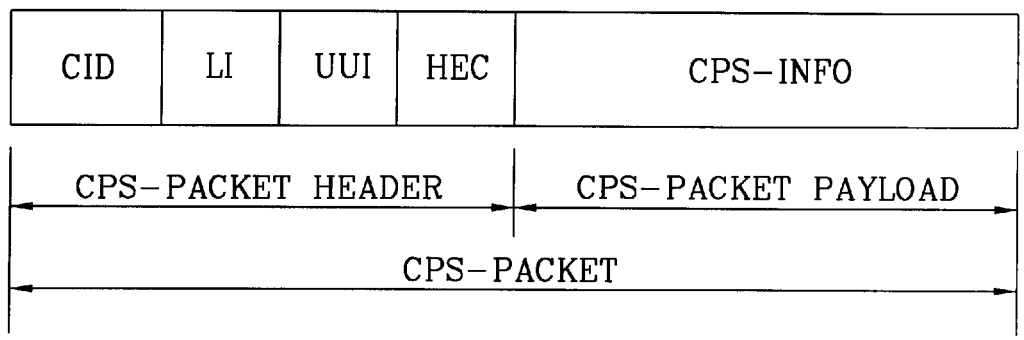
FIG. 2 is a view illustrating a data structure of CPS-packets generated from the AAL-2 protocol of FIG. 1.
Figure 3:
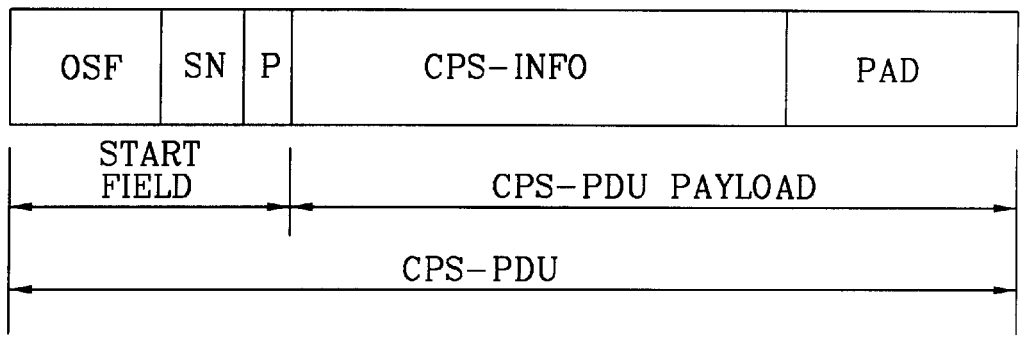
FIG. 3 is a view illustrating a data structure of a CPS-PDU generated from the AAL-2 protocol of FIG. 1.
Figure 4:
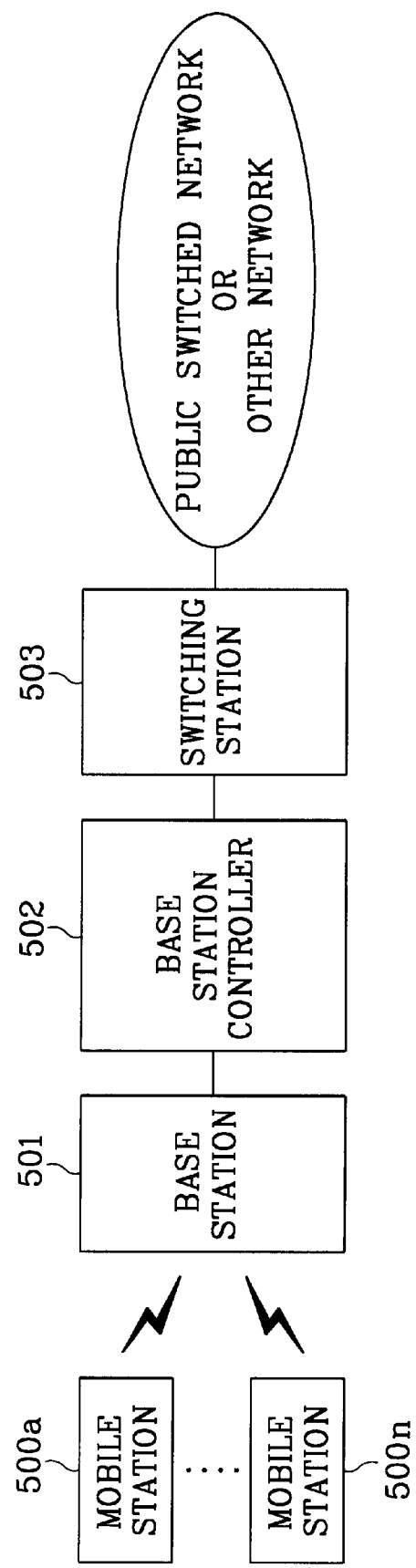
FIG. 4 is a block diagram of a general mobile communication system.

The AAL-2/AAL-5 processing apparatus according to the present invention is provided to a base station (BTS) 501 and a base station controller (BSC) 502 in a mobile communication system as illustrated in FIG. 4, and processes AAL-2 cells and AAL-5 cells transmitted through multiple virtual channels (VC) to thus transmit them to their destinations. At this time, a plurality of mobile stations 500a–500n can be regarded as AAL-2 users, and a switching station 503 can be regarded as an ATM layer.

FIG. 5 is a block diagram of an AAL-2/AAL-5 processing apparatus according to one embodiment of the present invention.

As illustrated therein, the AAL-2/AAL-5 processing apparatus according to the present invention includes: a CPU 100 for managing the state of each internal device according to an AAL-2 signal (e.g., received in an AAL-2 cell) and an AAL-5 signal (e.g., received in an AAL-5 cell); an AAL-5 processing unit 200 for processing an AAL-5 signal (e.g., received in an AAL-5 cell); and an AAL-2 processing unit 300 for processing an AAL-2 traffic and an AAL-2 signal (e.g., each received in an AAL-2 cell).

The CPU 100 manages the state of each internal device according to the AAL-2 signal and the AAL-5 signal, and generates cells for allocating and clearing CID information for Peer-to-Peer communication with a destination while allocating the CID information to the AAL-2 traffic or the AAL-2 signal The AAL-5 processing unit 200 includes: an AAL-5 processor 201 for deassembling and assembling an AAL-5 signal; transmission FIFOs 202 and 203 for transmitting the AAL-5 signal outputted from the AAL-5 processor 201; and receiving FIFOs 204 and 205 for receiving the AAL-5 signal to output the same to the AAL-5 processor 201.

The AAL-2 processing unit 300 includes an user interface 301, cell transmission unit 302, cell receiving unit 303, and transmission/receiving interface 304.

The user interface 301 transmits/receives AAL-2 users and cells, and the transmission/receiving interface 304 transmits/receives ATM layers and cells. In addition, the user and transmission/receiving interfaces 301 and 304 judge whether an inputted cell is AAL-2 or AAL-5.

The cell transmission unit 302 includes: a Mini-Cell Assembly (MCA) 34 for allocating a CPS packet header to an inputted AAL-2 cell to thus generate CPS packets by each user; a DPRAM 35 for storing channel identifier information (CID) to be allocated to the AAL-2 cell; a CPS-PDU Assembly(CPA) 37 for multiplexing CPS packets outputted from the MCA 34 to generate a fixed sized CPS-PDU; a plurality of FIFOs 38a–38n for storing the CPS-PDU outputted from the CPA 37 according to a VC; and a FIFO Controller Assembly(FCA) 39 for outputting the CPU-PDU by controlling the output order thereof according to the storing state of the plurality of FIFOs 38a–38n.

The cell receiving unit 303 includes: a CPS-PDU Deassembly (CPD) 47 for generating CPS packets by each user by removing the CPS packet header from the AAL-2 cell (CPS-PDU) inputted from the transmission/receiving interface 304; a plurality of FIFOs 46a–46n for storing CF'S packets by channels according to the CID information of each CF'S packet; a Mini Cell Deassembly (MCD) 44 for deassembling the CPS packet outputted from the plurality of FIFOs 46a–46n into mini cells; and a DPRAM 45 for storing the address information on the deassembled mini cells. In addition, the cell receiving unit 303 further includes FIFOs 41–43 and 48.

The operation of the thusly constructed AAL-2/AAL-5 processing apparatus according to the present invention will now be described with reference to FIG. 5.

1. Receiving operation of AAL-2/AAL-5 processing apparatus

The transmission/receiving interface 304 receives a 48-byte cell(CPS-PDU) from an ATM layer and checks whether the corresponding cell is an AAL-5 cell or AAL-2 cell.

As the result of checking, if the inputted cell is an AAL-5 signal, the transmission/receiving interface 304 checks again whether the AAL-5 cell is an AAL-5 traffic or AAL-5 signal.

If the inputted cell is an AAL-5 traffic, it is transmitted to other user at the outside through the FIFO 43 and the user interface 301. At this time, for the corresponding destination information, refer to its routing tag(R-TAG).

On the contrary, if the inputted cell is an AAL-5 signal, the transmission/receiving interface 304 transmits the corresponding AAL-5 signal to the CPU 100 through the FIFO 205 of the AAL-5 processing unit 200. The CPU 100 controls each internal device according to an inputted AAL-5 signal, and allocates channel identifier(CID) information of the DPRAM 45.

Meanwhile, if the 48-byte cell (CPS-PDU) transmitted from the ATM layer is an AAL-2 cell, the transmission/receiving interface 304 checks again whether the corresponding AAL-2 cell is an AAL-2 traffic or AAL-2 signal. As the result of checking, if the AAL-2 cell is an AAL-2 traffic, it is outputted to the CPD 47 through the FIFO 48, and the CPD 47 separates the header from the AAL-2 traffic (CPS-PDU) to thus generate CPS packets for each user Continuously, the CPD 47 stores a plurality of FIFOs 46a–46n with reference to the CID of the header of each generated CPS packet. The CPS packet stored in the respective FIFO 46a–46n is inputted to the MCD 44 to thus be deassembled into mini cells for each user. Accordingly, each deassembled mini cell is transmitted to the corresponding destination through the FIFO 42 and the user interface 301 with reference to transmission information such as address information on the destination stored in the DPRAM 45. At this time, each mini cell refers to transmission information stored in the DPRAM 45 according to its own channel allocation information (CID).

As the result of checking, however, if the transmitted cell is an AAL-2 signal, the AAL-2 signal is processed in the same procedure as the AAL-2 traffic to be inputted to the user interface 301 because it is a signal for use in internal processing. Thereafter the AAL-2 signal is directly transmitted to the CPU 100 through the FIFO 41. At this time, the CPU 100 updates the DPRAM 45 of the cell transmission unit 303 according to the AAL-2 signal for thereby controlling the allocation of the CID.

2. Transmission operation of AAL-2/AAL-5 processing apparatus

The cell transmitted from each AAL-2 user is mainly divided into an AAL-2 traffic and an AAL-5 signal. At this time, the AAL-2 user represents a selector or vocoder in the case that the AAL-2/AAL-5 processing apparatus according to the present invention is provided to the base station controller (BSC).

First, the user interface 301 discriminates whether the cell inputted from the AAL-2 user is an AAL-2 traffic or AAL-5 signal. As the result of discrimination, if an AAL-2 traffic, the corresponding cell is inputted to the MCA 34 through the FIFO 33, and the MCA 34 generates CPS packets by allocating the CID information stored in the DPRAM 35 to the AAL-2 traffic of each user. The CPA 37 stores a 48-byte CPS-PDU in the FIFOs 38a–38n by multiplexing the generated CPS packets through the FIFO 36 and appending a header thereto.

Therefore, the FCA 39 checks the state of the FIFOs 38a–38n and transmits the stored CPS-PDU to the transmission/receiving interface 304 through the FIFO 40. The transmission/receiving interface 304 transmits the 48-byte CPS-PDU to the ATM layer. At this time, the FCA 39 serves to control the transmission order each FIFOs 38a–38n.

Meanwhile, the cell transmitted from the AAL-2 user is an AAL-5 signal, the user interface 301 checks again whether the AAL-5 signal is a self-processing signal, or a signal to be delivered to other user at the outside. If the AAL-5 signal is a self-processing signal, the user interface 301 outputs the AAL-5 signal to the CPU 100 through the FIFO 204, and the CPU 100 controls each internal device constructing the AAL-2/AAL-5 processing apparatus and allocates CID information of the DPRAM 35 according to the AAL-5 signal. However, if the AAL-5 signal is a signal to be delivered to other user at the outside, the user interface 301 transmits the corresponding AAL-5 signal to the transmission/receiving interface 304 through the FIFO 31 or using the FIFO 31 with the FCA 39 and FIFO 40, thus transmitting the AAL-5 signal to the corresponding destination.

Meanwhile, when the CPU 100 allocates CID information on the AAL-2 traffic or AAL-2 signal, it generates cells for allocating and clearing the CID information for Peer-to-Peer communication with their destinations to transmit the same. At this time, the cells generated from the CPU 100 are transmitted to the corresponding destination through the FIFO 32, MCA 34, and CPA 37. At this time, the CPU 100, the signal for allocation of CID is managed by ANP(AAL-2 Negotiation Procedures).

In addition, the CPU 100 outputs an AAL-5 signal generated therefrom through the FIFOs 202 and 203, performs allocation, clearance, and update of CID information stored in the DPRAMs 35 and 45 according to the AAL-5 signal and AAL-2 signal.

As described above, the AAL-2/AAL-5 processing apparatus processes a traffic by the AAL-2 supporting multiple VCs, and processes a signal by the AAL-5. Accordingly, the AAL-2/AAL-5 processing apparatus according to the present invention has an effect of increasing the speed and efficiency of the communication system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An AAL-2/AAL-5 processing apparatus in a mobile communication system, comprising:

an user interface for transmitting/receiving cells by connecting to an AAL-2 user; transmission/receiving interface for transmitting/receiving cells by connecting to an ATM layer;

an AAL-2 receiving unit for receiving an AAL-2 cell from the transmission/receiving interface and deassembling the same into mini cells to thereafter transmit them to each AAL-2 user;

an AAL-2 transmission unit for multiplexing the AAL-2 cell inputted from the user interface into a single cell to thus transmit the same to the ATM layer;

an AAL-5 processing unit for processing an AAL-5 signal received in an AAL-5 cell transmitted from one of the ATM layer and the AAL-2 user; and a CPU for controlling the AAL-2 receiving unit and the AAL-2 transmission unit upon receipt of the AAL-5 signal from the AAL-5 processing unit.

2. The apparatus of claim 1, wherein the CPU updates CID allocation information on received cells upon receipt of a control signal in the AAL-2 cell received from the AAL-2 receiving unit.

3. The apparatus of claim 1, wherein the receiving unit comprises:
- a CPS-PDU Deassembly (CPD) for generating CPS packets by removing the CPS packet header of each AAL-2 cell inputted from the transmission/receiving unit;
- a first buffer unit for temporally storing the CPS packets generated from the CPD according to the corresponding channel identifier information (CID);
- a Mini Cell Deassembly (MCD) for deassembling the CPS packets outputted from the first buffer unit into mini cells;
- a first DPRAM for storing the address information on the destination of the mini cells; and
- a second buffer unit for temporally storing the mini cells from the MCD and thereafter outputting the same to the user interface.

4. The apparatus of claim 3, wherein the first buffer unit comprises a plurality of FIFOs whose number is identical to that of channels, and the second buffer unit comprises a first FIFO for transmitting a received AAL-2 traffic to the user interface, and a second FIFO for outputting a received control signal in the mini cells to the CPU.

5. The apparatus of claim 3, wherein the AAL-2 receiving unit further comprises a third FIFO for transmitting an AAL-5 cell transmitted from the ATM layer to an external destination through the user interface.

6. The apparatus of claim 1, wherein the AAL-2 transmission unit comprises:
- a Mini-Cell Assembly (MCA) for generating CPS packets by each user by allocating a CPS packet header to the AAL-2 cell of each user;
- a second DPRAM for storing channel identifier information (CID) to be allocated to the AAL-2 cell of each user;
- a CPS-PDU Assembly (CPA) for generating a fixed sized CPS-PDU by multiplexing the CPS packets outputted from the MCA;
- a third buffer unit for storing the CPS-PDU outputted from the CPA according to virtual channels (VC);
- a FIFO Controller Assembly (FCA) for outputting the CPS-PDU by adjusting the output order thereof.

7. The apparatus of claim 6, wherein the AAL-2 transmission unit further comprises a fourth FIFO for transmitting the AAL-5 cell transmitted from the AAL-2 user to an external destination through the transmission/receiving unit.

8. The apparatus of claim 6, wherein the third buffer unit comprises a plurality of FIFOs whose number is identical to that of the virtual channels.

9. The apparatus of claim 6, wherein the AAL-2 transmission unit further comprises:
- a fifth FIFO for outputting an AAL-2 traffic to the MCA; and
- a sixth FIFO for outputting the cells generated from the CPU for allocation and clearance of CID between AAL-2 terminals.

10. The apparatus of claim 1, wherein the AAL-5 processing unit comprises:
- an AAL-5 processor for deassembling and assembling the AAL-5 cell;
- seventh and eighth FIFOs for outputting the AAL-5 signal outputted from the AAL-5 processor to the transmission/receiving interface or user interface; and
- ninth and tenth FIFOs for outputting the AAL-5 signal outputted from the transmission/receiving interface or user interface to the AAL-5 processor.

11. The apparatus of claim 1, wherein the AAL-2 cells and the AAL-5 cells are processed through multiple virtual channels.

12. The apparatus of claim 1, wherein the AAL-2 transmission unit and the AAL-2 receiving unit each comprise:
- a buffer unit having plurality of storing devices equal in number to a number of virtual channels, wherein the plurality of storing devices are each configured to temporarily store in a sequence AAL-2 packets according to a corresponding channel identifier information (CID; and
- a controller configured to control storing the AAL-2 packets in the buffer unit according to each of the virtual channels.

13. The apparatus of claim 1, wherein the AAL-2 transmission unit and the AAL-2 receiving unit each comprise:
- a buffer unit having plurality of storing devices equal in number to a plurality of virtual channels, wherein the plurality of storing devices are each configured to temporarily store in a sequence CPS packets;
- a controller configured to control storing AAL-2 packets in the buffer unit responsive to of the plurality of virtual channels; and
- a CPS-PDU assembly/deassembly unit configured to perform one of assembly and deassembly of the CPS packets stored in the buffer unit.

14. The apparatus of claim 13, wherein the AAL-2 cells and the AAL-5 cells are processed through the plurality of virtual channels.

15. An AAL-2/AAL-5 processing apparatus in a mobile communication system, comprising:
- an user interface configured to one of transmit and receive cells by connecting to an AAL-2 user;
- transmission/receiving interface configured to one of transmit and receive cells by connecting to a switching station;
- an AAL-2 receiving unit configured to receive an AAL-2 cell from the transmission/receiving interface and deassemble the same into mini cells for transmission to each corresponding AAL-2 user;
- an AAL-2 transmission unit configured to multiplex the AAL-2 cell inputted from the user interface into a single cell for transmission to the switching station;
- an AAL-5 processing unit configured to process an AAL-5 signal received in one of an AAL-5 cell transmitted from the switching station and the cells receiving from the user interface; and
- a CPU configured to control the AAL-2 receiving unit and the AAL-2 transmission unit upon receipt of the AAL-5 signal from the AAL-5 processing unit, wherein the AAL-2 receiving unit comprises,
  - a CPS-PDU Deassembly (CPD) configured to generate CPS packets by removing the CPS packet header of each AAL-2 cell inputted from the transmission/receiving unit,
  - a first buffer unit configured to temporally store the CPS packets generated from the CPD according to the corresponding channel identifier information (CID),
  - a Mini Cell Deassembly (MCD) for deassembling the CPS packets outputted from the first buffer unit into mini cells,
  - a first storage device configured to store the address information on the destination of the mini cells, and
  - a second buffer unit configured to temporarily store the mini cells from the MCD and output the same to the user interface, wherein the first buffer unit comprises a plurality of storing units whose number is identical to that of channels, and the second buffer unit comprises a first storing unit configured to transmit a received AAL-2 traffic to the user interface, and a second storing unit configured to output a received control signal in the mini cells to the CPU.

16. An AAL-2/AAL-5 processing apparatus in a mobile communication system, comprising:

an user interface configured to one of transmit and receive cells by connecting to an AAL-2 user;

transmission/receiving interface configured to one of transmit and receive cells by connecting to a switching station;

an AAL-2 receiving unit configured to receive an AAL-2 cell from the transmission/receiving interface and deassemble the same into mini cells for transmission to each corresponding AAL-2 user;

an AAL-2 transmission unit configured to multiplex the AAL-2 cell inputted from the user interface into a single cell for transmission to the switching station;

an AAL-5 processing unit configured to process an AAL-5 signal received in one of an AAL-5 cell transmitted from the switching station and the cells receiving from the user interface; and a CPU configured to control the AAL-2 receiving unit and the AAL-2 transmission unit upon receipt of the AAL-5 signal from the AAL-5 processing unit, wherein the AAL-2 transmission unit comprises, a Mini-Cell Assembly (MCA) configured to generate CPS packets by each user by allocating a CPS packet header to the AAL-2 cell of each user, a second storage device configured to store channel identifier information (CID) to be allocated to the AAL-2 cell of each user, a CPS-PDU Assembly (CPA) configured to generate a fixed sized CPS-PDU by multiplexing the CPS packets outputted from the MCA, a buffer unit configured to store the CPS-PDU outputted from the CPA according to virtual channels (VC), and a Controller Assembly (CA) configured to output the CPS-PDU received from the buffer-unit by adjusting the output order thereof.

17. An AAL-2/AAL-5 processing apparatus in a mobile communication system, comprising:

an user interface configured to one of transmit and receive cells by connecting to an AAL-2 user;

transmission/receiving interface configured to one of transmit and receive cells by connecting to a switching station;

an AAL-2 receiving unit configured to receive an AAL-2 cell from the transmission/receiving interface and deassemble the same into mini cells for transmission to each corresponding AAL-2 user;

an AAL-2 transmission unit configured to multiplex the AAL-2 cell inputted from the user interface into a single cell for transmission to the switching station;

an AAL-5 processing unit configured to process an AAL-5 signal received in one of an AAL-5 cell transmitted from the switching station and the cells receiving from the user interface; and a CPU configured to control the AAL-2 receiving unit and the AAL-2 transmission unit upon receipt of the AAL-5 signal from the AAL-5 processing unit, wherein the AAL-5 processing unit comprises, an AAL-5 processor configured to deassemble and assemble the AAL-5 cell, first and second storing units that store in a sequence and are configured to output the AAL-5 signal outputted from the AAL-5 processor to the transmission/receiving interface or the user interface, and third and fourth storing units that store in a sequence and are configured to output the AAL-5 signal outputted from the transmission/receiving interface or the user interface to the AAL-5 processor.

* * * * *